INVENTOR.
DEWEY S. C. SANDERSON
BY
Bertha L. MacGregor
ATTORNEY

July 28, 1970          D. S. C. SANDERSON          3,522,011
URINALYSIS MACHINE

Filed May 18, 1967          8 Sheets-Sheet 5

INVENTOR.
DEWEY S. C. SANDERSON
BY
Bertha L. MacGregor
ATTORNEY

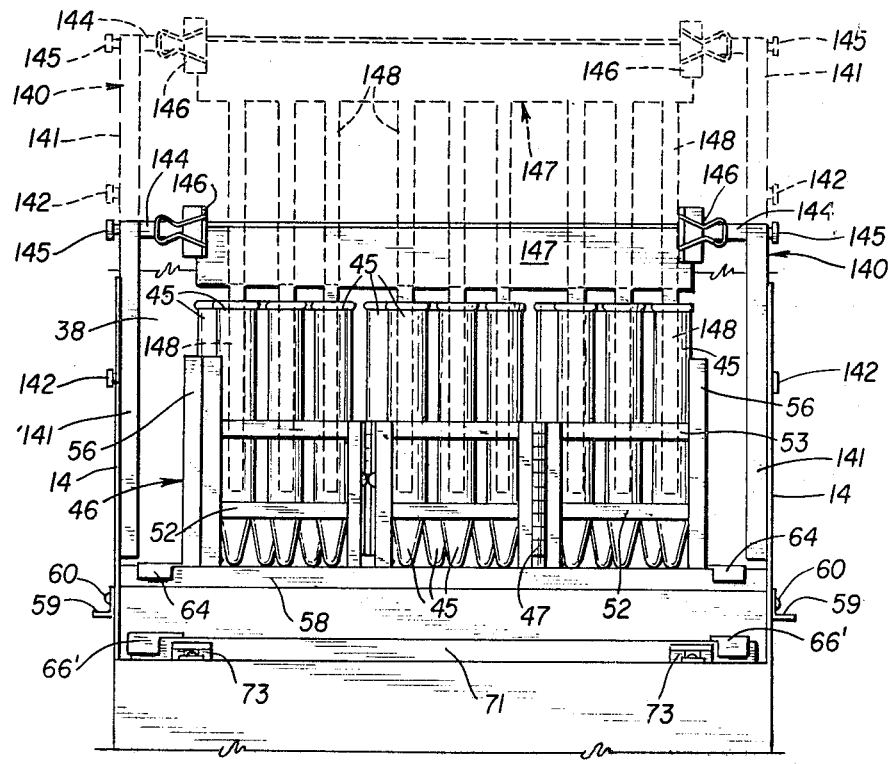
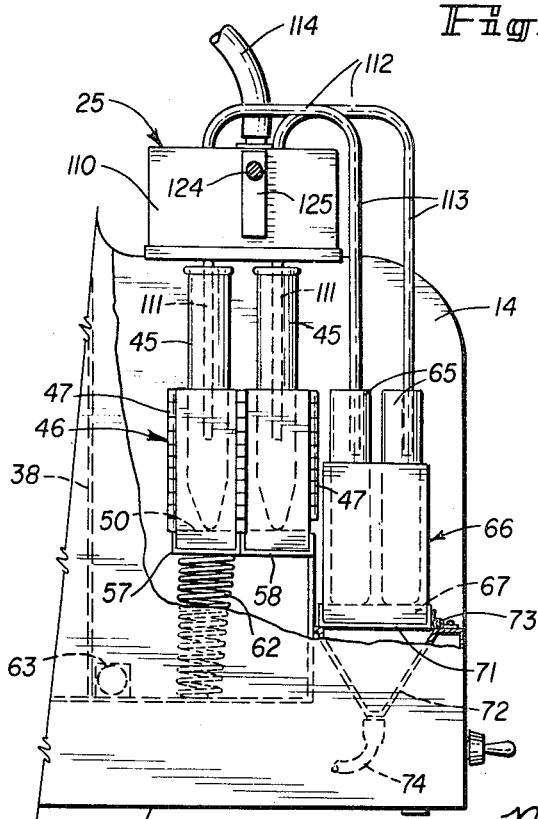

July 28, 1970 D. S. C. SANDERSON 3,522,011
URINALYSIS MACHINE
Filed May 18, 1967 8 Sheets-Sheet 7
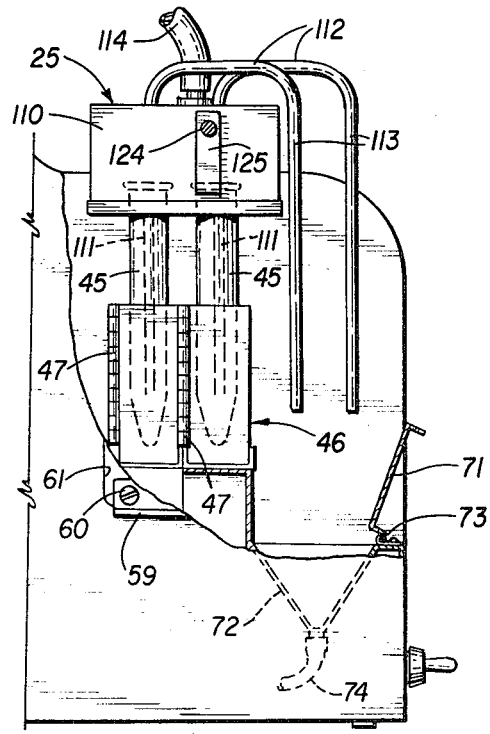
Fig_10
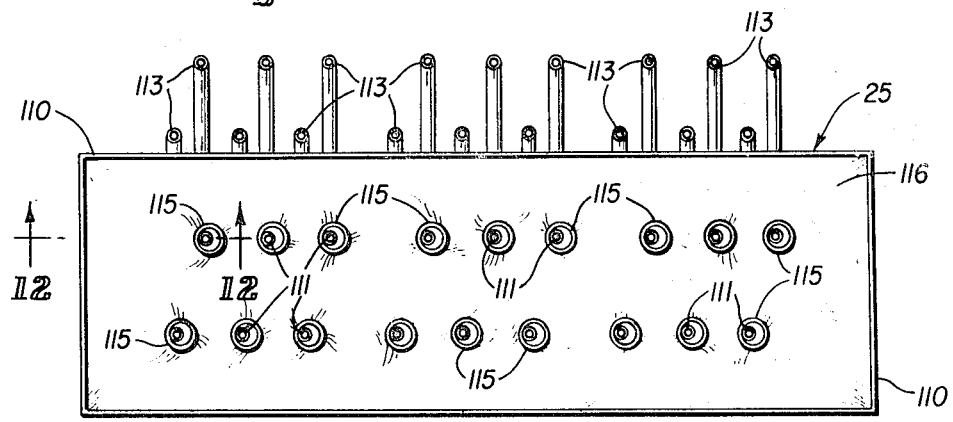
Fig_11
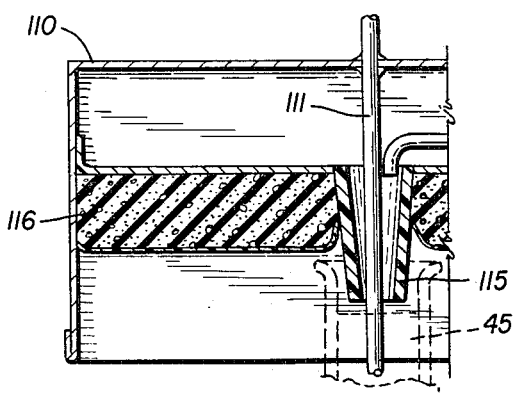
Fig_12
INVENTOR.
DEWEY S. C. SANDERSON
BY
Bertha L. MacGregor
ATTORNEY July 28, 1970     D. S. C. SANDERSON     3,522,011
URINALYSIS MACHINE
Filed May 18, 1967                                      8 Sheets-Sheet 8
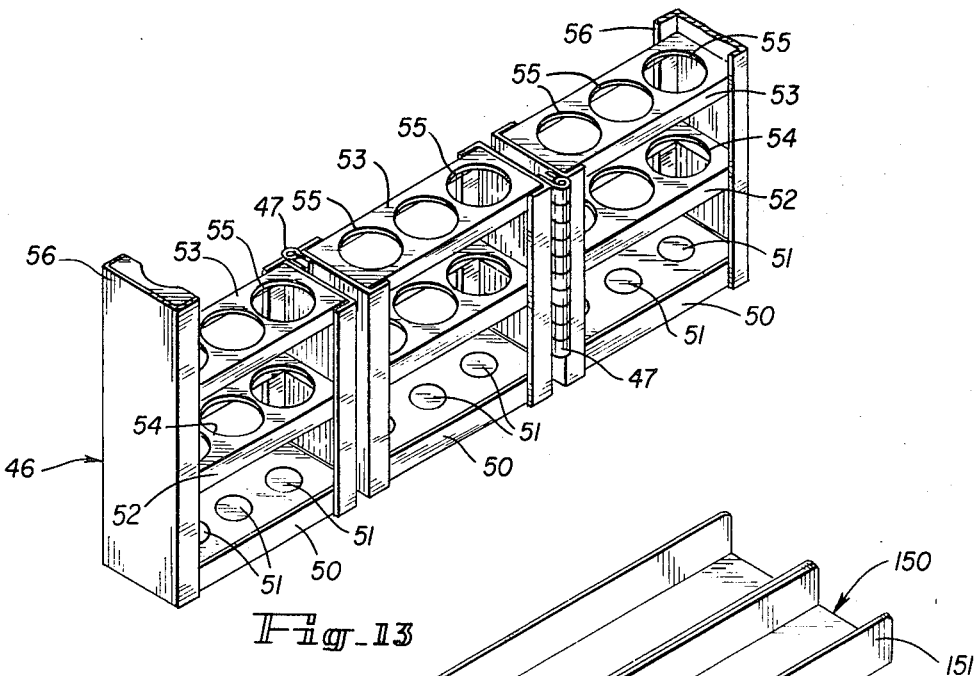
Fig_13
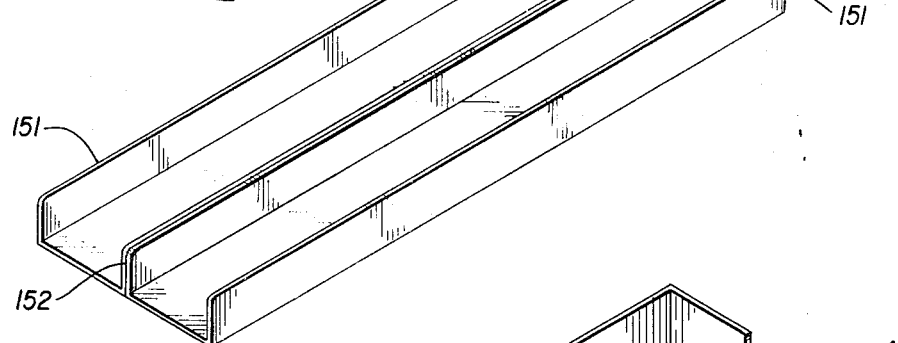
Fig_14
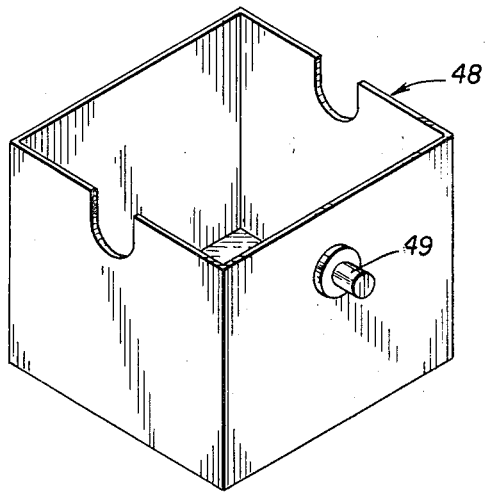
Fig_15
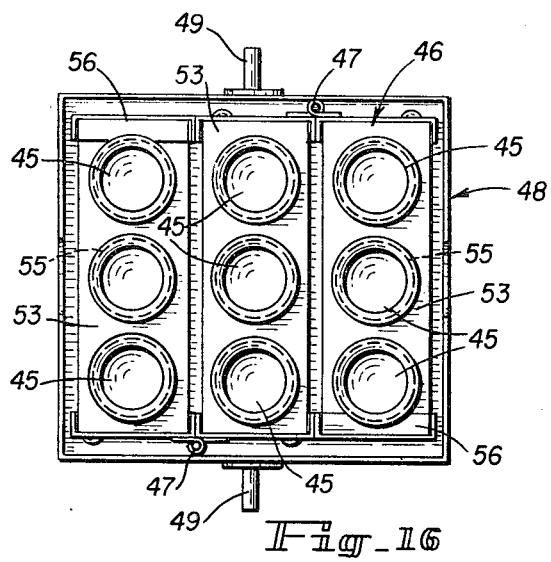
Fig_16
INVENTOR.
DEWEY S. C. SANDERSON
BY
Bertha L. MacGregor
ATTORNEY

United States Patent Office 3,522,011
Patented July 28, 1970

3,522,011
URINALYSIS MACHINE
Dewey S. C. Sanderson, 4890 Troy St.,
Denver, Colo. 80239
Filed May 18, 1967, Ser. No. 639,404
Int. Cl. B01l 9/00, 9/06, 11/00
U.S. Cl. 23—259                                    24 Claims

ABSTRACT OF THE DISCLOSURE

A machine for simultaneously handling a plurality of urine specimens for physical and chemical examinations, comprising a plurality of centrifuge tubes arranged in racks in one or more rows, a corresponding number of test tubes arranged in racks in corresponding rows adjacent the centrifuge tubes, a urinometer dispensing unit provided with urinometer gripping means for simultaneously moving urinometers from rest positions in cleansing troughs and depositing them in centrifuge tubes, a multi-decanting unit movable from rest position over cleansing troughs for simultaneously transferring supernatant fluid from centrifuge tubes to test tubes or to a drain, and a strip-dipper for simultaneously dipping a plurality of strips into contents of tubes for chemical tests. The racks for centrifuge tubes are foldable for placement of a plurality of tubes and contents in trunnion cups of a centrifuge without disarranging sequence of the specimens. Air pressure is conveyed through the multi-decanting unit to the surface of fluid in centrifuge tubes and to the surface of water in the decanting pipes cleaning trough to induce fluid flow. Electrically powered mechanism moves the urinometer dispensing unit and the multi-decanting unit from rest positions to the work area and vice versa.

---

This invention relates to a urinalysis machine designed to perform automatically the various urinalysis steps which heretofore have been done manually.

The main object of the invention is to provide apparatus for automatically simultaneously processing a plurality of urine specimens for the purpose of conducting physical analyses for color and appearance, specific gravity and microscopic examinations, and for observing chemical reactions done by the dip-stix method to screen for positive or negative reactions which include the pH reaction, albumin (protein) content, sugar, acetone, and blood. Heretofore the several tests have been conducted with respect to individual specimens each dealt with separately and manually by a laboratory technician.

The objects and advantages of my apparatus for automatically and simultneously handling any desired number of centrifuge tubes and test tubes and contents during a complete urinalysis procedure, in a sanitary manner, without manipulation of specimens and their containers by a laboratory technician, will be understood from the following general description of the procedure and the apparatus provided therefor.

In the embodiment of the apparatus shown in the drawings, the machine comprises a plurality of centrifuge tubes arranged in two transversely extending rows, a plurality of test tubes also arranged in two transversely extending rows located forwardly of the centrifuge tubes, a multi-decanter unit located in rest position above a decanter cleansing trough, a urinometer dispener unit located in rest position above a urinometer cleansing trough, a track on which the multi-decanter unit is automatically movable to position over the work area above the centrifuge and test tubes, a track on which the urinometer dispenser unit is automatically movable to position over the work above the centrifuge tubes, a strip-dipper member for holding and placing a plurality of dip-stix in test tubes, and water inlet and outlet conduits, air lines and other mechanism to be described hereinafter.

*Physical Analyses* include tests performed for color and appearance and specific gravity, and microscopic examinations for organized and unorganized sediment.

In the apparatus of this invention, the color and appearance examination is done by looking at urine specimens in the centrifuge tubes which, in this embodiment, are arranged in racks in two transversely extending rows staggered with respect to each other. The machine frame or housing is provided with means for raising the rearward rack to facilitate visual examination. A fluorescent light is located in the housing rearwardly of the specimens to aid in the inspection. After the color and appearance examination, the raised rack is lowered to initial position. This examination is made without touching the tubes or their contents.

The specific gravity test is conducted by the use of the urinometer unit. A plurality of urinometers, equal in number and located in positions corresponding to the centrifuge tubes and specimens therein, are gripped in two rows in the urinometer dispenser unit by transversely movable gripper bars, in such positions that the urinometers drop into the centrifuge tubes when the urinometer dispenser unit has been moved on its track from the rest position to dispensing position, and the gripper bars are actuated to release the urinometers. After release of the urinometers, the dispensing unit is moved on its tracks, out of the work area, to its inactive position. Then the urinometers in the centrifuge tube contents are read. To remove the urinometers from the tubes, the dispensing unit is moved forwardly to again grip the urinometers and automatically return them to the cleansing trough, while held by the dipsensing unit, where they rest in flowing water in readiness for the next cycle of operations.

Heretofore, specific gravity tests required the laboratory technician to place a urinometer in each centrifuge tube, to read each urinometer, and then manually remove each urinometer and handle it for cleansing purposes. The apparatus of this invention permits the technician to subject any desired number of specimens, limited only by the capacity of the machine, to testing by simultaneous automatic placement of the urinometers in centrifuge tubes, followed by reading and then by simultaneous removal to the cleansing trough while gripped in the dispensing unit for the succeeding use.

Microscopic examinations are done by removing the hinged centrifuge racks in which the tubes are held, folding the racks and placing the folded racks, with specimen tubes therein, in trunnion cups of a centrifuge without disturbing the sequence of the specimen containing centrifuge tubes. After centrifugation, the centrifuge racks and tubes are removed from the centrifuge, unfolded, and replaced in sequence in the urinalysis apparatus for microscopic examination.

Heretofore, such microscopic examinations required a technician to place individual centrifuge tubes in a centrifuge, remove them manually and replace them one by one in racks for examination.

*Chemical Analyses* include tests performed to observe the pH reaction, albumin (protein), sugar, acetone and blood contents. All chemical tests are made before centrifuging except those for albumin which employ centrifuged supernatant fluid, and those microscopic tests for organized and unorganized sediment. Centrifuging is done after dip-stix tests for pH reaction, sugar, acetone and blood. The albumin test is readable on dip-stix but some laboratories do not rely on this reading and therefore repeat the test by use of centrifuged supernatant fluid and acid in test tubes.

The chemical reaction procedures of my invention employ a strip-dipper which comprises a cross bar and two legs connected to the cross bar adjacent opposite ends. The legs are insertible in slots in opposite side walls of the machine housing or frame. In this embodiment, nine strips (called "stix") depend from a cross piece attached by clamps to the cross bar of the strip-dipper; the strips being spaced to be dipped into the tubes of one row of test tubes. The strip-dipper may be constructed to service one row of test tubes or be widened so that the strips automatically enter the test tubes of two or more rows simultaneously. After the dip-stix have been immersed in the contents of the test tubes they are elevated and remain suspended until readings are completed.

Before the described chemical analyses can be made for albumin, which is done after centrifuging, it is necessary to convey supernatant fluid from the contents of the centrifuged specimens in the centrifuge tubes to the test tubes. For this purpose, the multi-decanter unit is moved from its inactive position over its cleansing trough to its operative position over the centrifuge tubes and test tubes. The multidecanter unit comprises a plurality of pipes depending from a support, each decanter pipe consisting of an up-flow intake conduit, integral with a forwardly extending horizontal conduit and a down-flow outlet conduit. The up-flow intake conduits are located for entry into the contents of the centrifuge tubes, and the down-flow outlet conduits are located to decant fluid into the test tubes. The up-flow intake conduits of the pipes are shorter than the down-flow outlet conduits and are arranged in two rearward staggered rows, with the outlet conduits in two forward rows. After the multi-decanter unit has been moved into operative position and the conduits have been inserted into the centrifuge tubes and test tubes, air pressure is applied to the surface of the contents of the centrifuge tubes, forcing the centrifuged urine supernatant into the test tubes containing the albumin reagent.

The multi-decanter unit also is employed in microscopic examinations subsequent to centrifugation of specimens. For microscopic reading it is desirable to have a small amount of the supernatant fluid in the centrifuge tubes in which to re-suspend sediment for examination. The amount should be uniform in all the centrifuge tubes. Decanting of excess supernatant fluid from the centrifuge tubes is performed by removing the rack containing the test tubes, raising a drain cover, and forcing excess fluid by air pressure into the drain by means of the multi-decanter described in connection with the chemical tests. After use, the multi-decanter unit is returned to the decanter cleansing trough where air pressure is applied to force clean water through the pipes of the unit into the drain.

Heretofore the several steps described for conducting chemical analyses, some involving decanting of supernatant fluid from centrifuge tubes for conveyance to test tubes or to a waste drain, have required handling of individual tubes and pouring of supernatant fluid from one tube to another, resulting in non-uniform specimens, unsanitary surroundings, and great expenditure of time and effort on the part of technicians.

The disadvantages and objections inherent in manual handling apparent from the foregoing general description of procedures have been eliminated by the use of the apparatus shown in the drawings and hereinafter described in detail.

In the drawings:

FIG. 8 is a partial front view showing the strip dipper to which are attached the dip-stix used in making chemical analyses of the contents of the centrifuge tubes, the strip dipper being shown in two positions, in full and broken lines, respectively.

FIG. 9 is an elevational side view of part of the machine, partly in section and broken away to show the multi-decanter unit and two of the decanting pipes, in which the up-flow intake conduits extend into the centrifuge tube contents and the down-flow outlet conduits extend into test tubes for decanting centrifuge tube contents into the test tubes.

FIG. 10 is a view similar to FIG. 9, showing the test tubes and supporting rack removed to permit the waste drain cover to be raised and the contents of the centrifuge tubes to be decanted into the waste drain.

FIG. 11 is a bottom view of the multi-decanter unit.

FIG. 12 is a transverse vertical sectional view in the plane of the line 12—12 of FIG. 11, showing a decanting conduit and an air pipe for conducting pressurized air to the top of the contents of the centrifuge tube.

FIG. 13 is an isometric view of one of the foldable centrifuge tube racks, the right hand handle being shown broken away.

FIG. 14 is a perspective view of a tray for two centrifuge tube racks.

FIG. 15 is a trunnion cup adapted to be mounted in a centrifuge.

FIG. 16 is a plan view of the centrifuge tube rack of FIG. 13 as it appears when folded and contained within the trunnion cup of FIG. 15.

Figure 1:
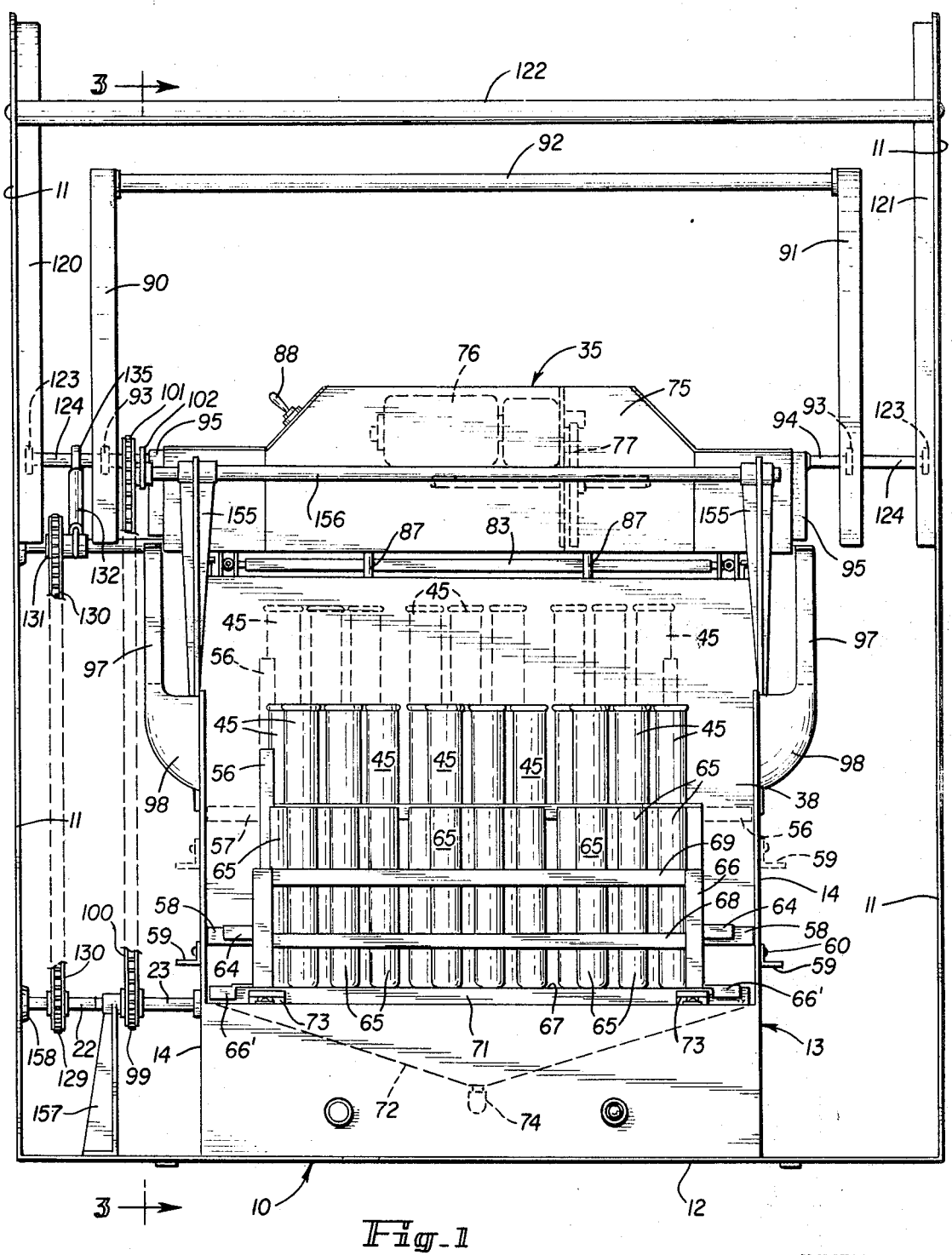
FIG. 1 is an elevational front view of the urinalysis machine embodying my invention, showing centrifuge tubes and test tubes in full lines and showing the rearward row of centrifuge tubes in broken lines as they appear when raised for viewing contents.
Figure 3:
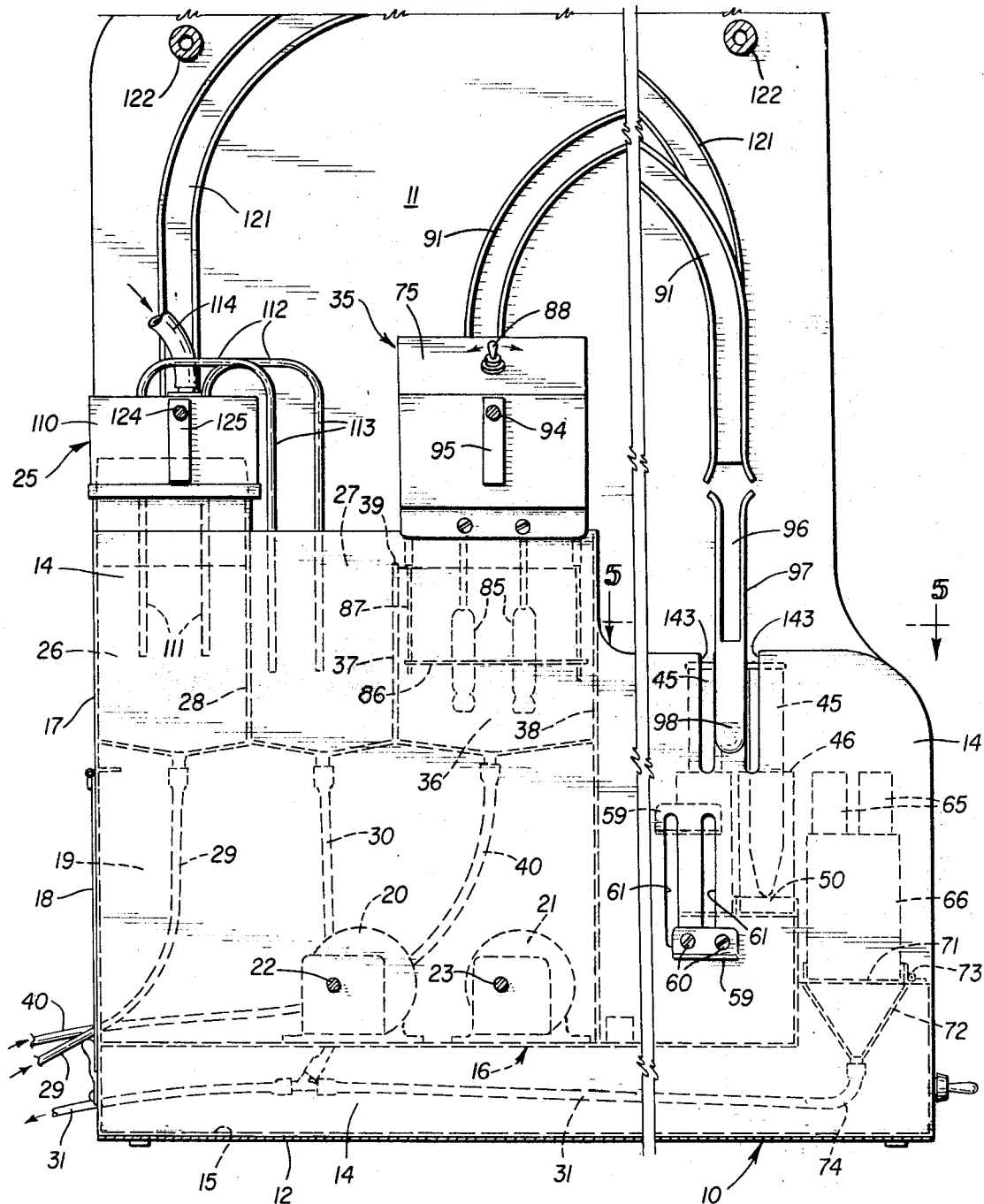
FIG. 3 is a vertical sectional view in the plane of the line 3—3 of FIG. 1.
Figure 4:
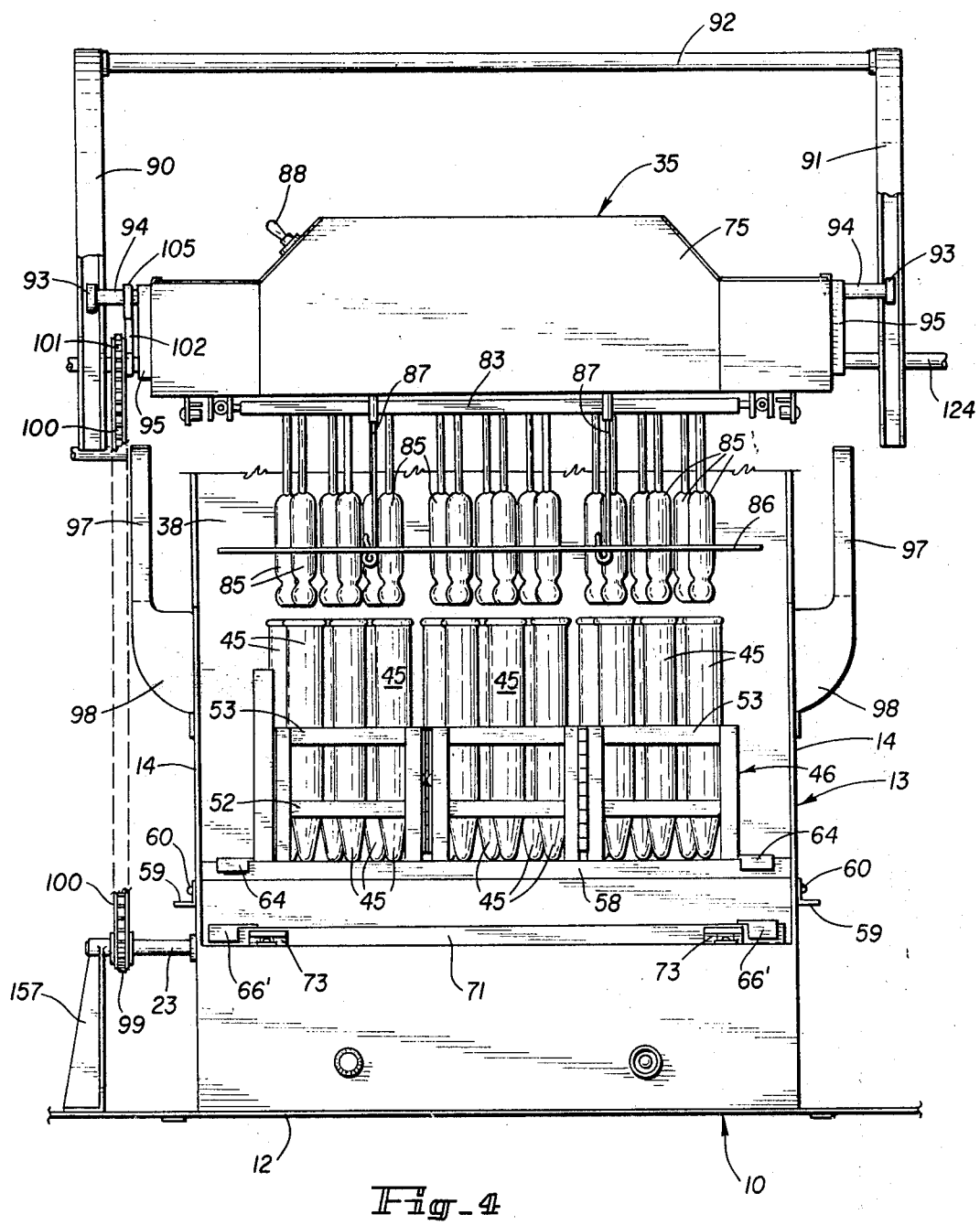
FIG. 4 is an elevational front view of the machine, showing the urinometer dispensing unit after it has been moved forwardly to the working area above the centrifuge tubes, preparatory to being lowered to insert the urinometers into the tubes. In this view the multi-decanted is concealed behind the urinometer dispensing unit, and the multi-decanter tracks and outer housing have been omitted.

In that embodiment of the invention shown in the drawings, the stationarmy parts of the machine, best shown in FIGS. 1 and 3, comprise a main housing 10 having sides 11 and base 12, an inner housing 13 having sides 14, bottom 15, horizontal partition 16, and rear wall 17. The rear wall 17 is provided with a hinged door 18 for access to the interior of the chamber 19. Motors 20, 21, with shafts 22, 23, respectively, are supported on the horizontal partition 16 for driving mechanism described hereinafter.

The upper edges of the rearward portions of the side walls 14 support a multi-decanter unit 25 which will be described in detail hereinafter. Beneath the unit 25, when in its rest position, are two adjacent troughs 26, 27, which extend across the housing 13 and are separated from each other by the vertical partition 28. The trough 26 communicates with a water intake pipe 29. The trough 27 communicates with a drain pipe 30 which leads to the drain pipe 31 below the partition 16.

The upper edges of the side walls 14, forwardly of the troughs 26, 27, support a urinometer dispensing unit 35 which will be described in detail hereinafter. Beneath the unit 35, when in its rest position, is a trough 36 which extends across the housing 13 between a partition 37 and the front wall 38 of the housing 13. The top edge 39 of the partition 37 is slightly lower than the top edge of the walls 14 and 38. The trough 36 communicates with a water intake pipe 40.

CENTRIFUGE TUBES AND RACKS

Centrifuge tubes 45, in the embodiment of the invention shown in the drawings, are arranged in two rows of nine each. The number of rows and the number of tubes may be varied but the arrangement shown is adapted for the multi-decanter unit 25 and urinometer dispensing unit 35 as shown herein, but these units may be altered to cooperate with other arrangements of tubes and rows of tubes. The centrifuge tubes receive urine specimens to be analyzed. The tubes 45 are supported in two racks 46 such as shown in FIG. 13, each comprising three sections hingedly connected by hinges 47 so the racks can be folded and placed in trunnion cups 48 with trunnions 49 as shown in FIGS. 15 and 16 for placement in a centrifuge (not shown). Each section of a rack 46 comprises a base shelf 50 with rubber seats 51 for the tube bottoms, and vertically spaced shelves 52, 53 provided with tube-receiving openings 54, 55, respectively, registering axially with the seats 51. Hand-holds 56 are provided at opposite ends of the racks 46 to facilitate lifting of the racks and tubes.

Figure 5:
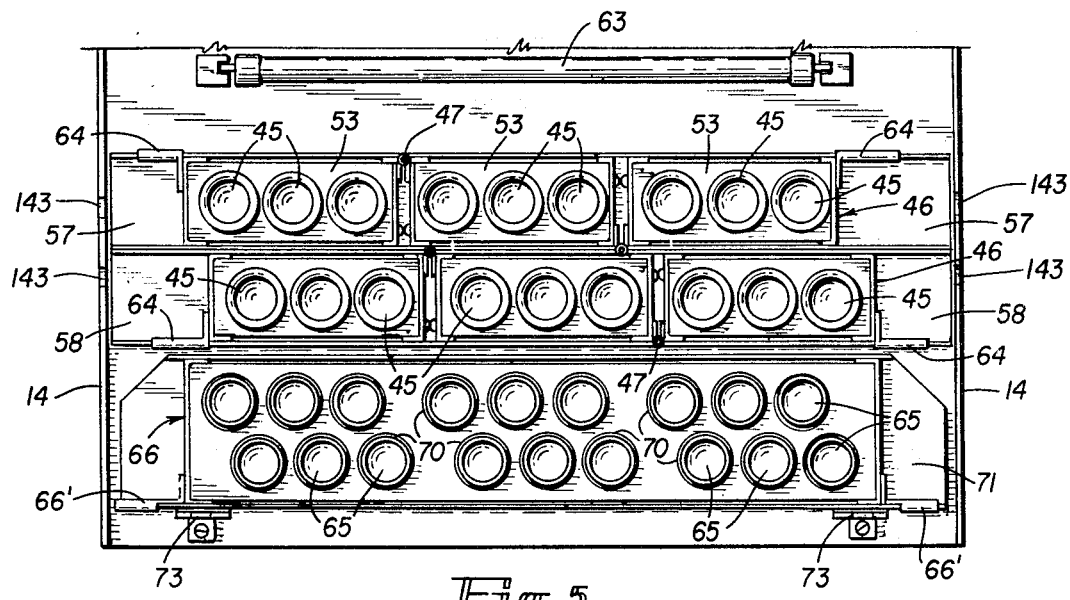
FIG. 5 is a horizontal sectional view in the plane of the line 5—5 of FIG. 3, showing the tops of the centrifuge tubes and test tubes supported in removable racks.
Figure 6:
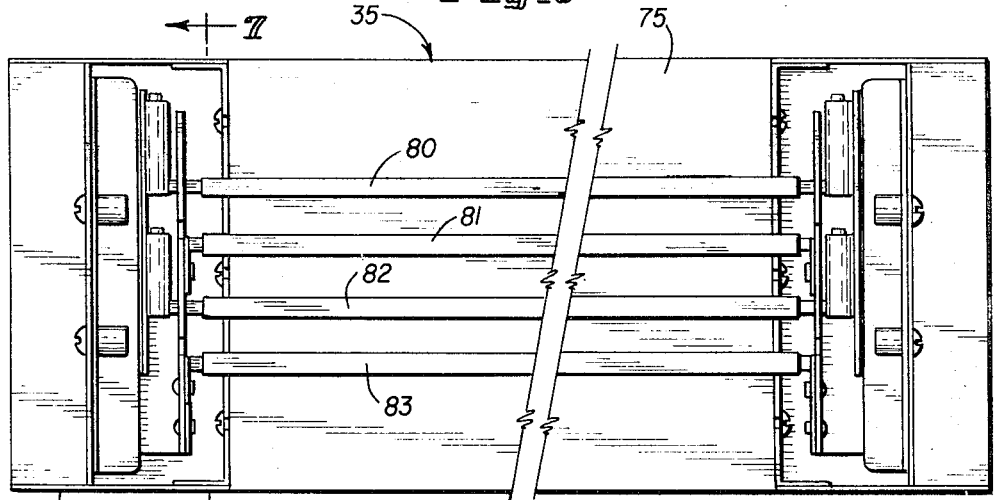
FIG. 6 is a bottom view of the urinometer dispensing unit.
Figure 7:
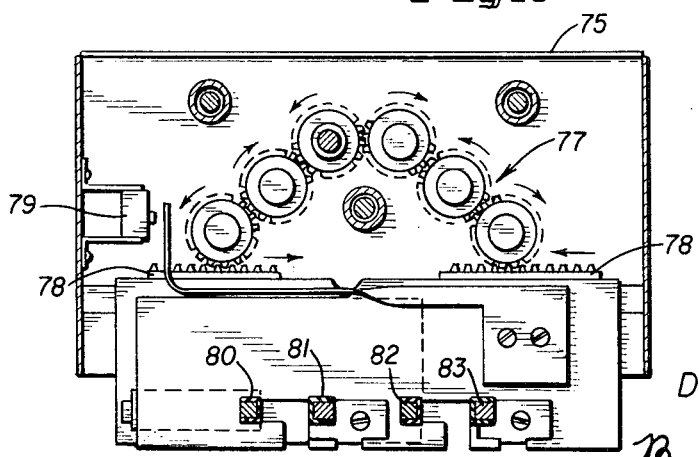
FIG. 7 is a vertical sectional view in the plane of the line 7—7 of FIG. 6, showing the mechanism which moves the urinometer gripping bars to and from each other.

As shown in FIG. 5, the racks 46 with centrifuge tubes 45 are supported on trays 57, 58. The rearward tray 57 is movably mounted and the forward tray 58 is fixedly mounted in the side walls 14. The means for raising the tray 57 comprise a handle 59 located adjacent the outer surface of each side wall 14, connected to opposite ends of the tray 57 by screws or rivets 60 (FIG. 3). The tray 57 can be raised by moving the handles 59 slightly rearwardly to bring the shanks of the screws or rivets 60 into the bottoms of slots 61, whereupon under influence of the spring 62 (FIG. 9), the tray 57 and centrifuge tubes 45 supported thereon are moved upwardly, where the tube contents can be viewed with the aid of the lamp 63 (FIG. 5). The racks 46 are located on the trays 57 and 58 between guides 64 so that the rows of tubes 45 are staggered relatively to each other. This arrangement facilitates viewing of the tubes and contents and also the insertion of the decanting pipes in the tubes, as explained hereinafter.

TEST TUBES AND RACKS

Test tubes 65 are arranged in two rows, located forwardly of the centrifuge tubes 45, supported in a rack 66 which resembles the racks 46 except that the rack 66 is made of a single section comprising a bottom 67, and two vertically spaced apart shelves 68, 69, provided with tube receiving openings 70, the openings o fthe two rows being staggered relatively to each other. The rack 66 is removably supported on the cover 71 of the waste drain 72. The rack 66 is guided to proper position by the guides 66' on the upper surface of the cover 71. The cover is hingedly mounted between the side walls 14 as indicated at 73 in FIG. 9. A waste drain 74 connects the drain 72 to the waste pipe 31 (FIG. 3).

URINOMETER DISPENSING UNIT

The unit 35 comprises a casing 75 which encloses a motor 76, gearing 77, racks 78 meshing with gears 77, and micro-switch 79. This mechanism moves a uninometer gripping bar 80 toward its adjacent bar 81, and moves urinometer gripping bar 82 toward its adjacent bar 83, to grip urinometers 85 between the bars of the two pairs. The bars 80, 81, when in gripping positions, extend over the open tops of the centrifuge tubes 45 of the rear row of tubes, and the bars 82, 83, when in gripping positions, extend over the open tops of the centrifuge tubes 45 of the forward row. The urinometers, when gripped by the bars, are guided into the tubes 45 through openings in a vertically movable plate 86 suspended from the dispensing unit 35 by hangers 87. The plate 86 slides upwardly on the hangers 87 when the unit 35 is lowered so the plate rests on top of the centrifuge tubes 45. A switch button for actuating the motor 76 is indicated at 88. Urinometers 85 are released by actuating the bars 80 and 82 to move them away from the bars 81 and 83, respectively.

URINOMETER DISPENSING UNIT TRACKS

The tracks on which the urinometer dispensing unit 35 is moved from its rest position to the work area and vice versa are shown in FIGS. 1–4. Left and right hand tracks 90, 91, are connected by a brace rod 92. The tracks 90, 91 are curved, and channel form in cross section, to receive rollers 93 loosely mounted on stub shafts 94 projecting from opposite side walls of the casing 75. Guide blocks 95 are fixedly mounted on the side walls of the casing 75 in vertical alignment with the stub shafts 94. The guide blocks 95 are provided with parallel vertical side edges and are adapted to enter the channel 96 in the vertical arm 97 of the bracket 98 connected to each side wall 14 of the housing 13 for the purpose of guiding the dispensing unit 35 into proper position for dispensing urinometers 85 into the tubes 45.

The mechanism for moving the dispensing unit 35 in the tracks 90, 91, is located at the left hand side of the machine. It comprises the motor 21, sprocket wheel 99 on the end of the motor shaft 23, belt 100, and upper sprocket wheel 101, having a hub to which is connected the hollow arm 102. An inner arm 103 and coiled spring 104 are telescopically mounted in the hollow arm 102. The arm 103 is pivotally connected at 105 to the stub shaft 94. Thus when the sprocket 101 is rotated by the motor 21, shaft 23, and belt 100, swinging movement is imparted to the arm 102, 103. The inner arm 103 and spring automatically adjust the combined length of the arms 102 and 103 to the radii of the track 90 and move the urinometer dispensing unit 35 in the tracks 90 and 91.

MULTI-DECANTING UNIT

The unit 25 comprises a casing 110 which supports decanting means best shown in FIGS. 2, 3, and 9–12. A decanting pipe is provided for each centrifuge tube 45. Each decanting pipe comprises an up-flow intake conduit 111, integral with a forwardly extending horizontal portion 112 and a down-flow decanting conduit 113. The conduits 111 are mounted in the casing 110 in two rows in staggered arrangement corresponding to the positions of the centrifuge tubes 45 in their racks 46, and are of sufficient length below the casing 110 to extend downwardly into the tubes 45 as shown in FIG. 9. The portions 112 extend forwardly sufficiently to merge into the down-flow conduits 113 which are arranged in two rows to correspond to the positions of the test tubes 65 in the rack 66 located forwardly of the centrifuge tubes 45 and racks 46; as shown in FIG. 9. An air intake line 114 communicates with the interior of the casing 110 for delivering pressurized air to nozzles 115 mounted in yielding material 116 on the lower side of the casing, the nozzles surrounding the conduits 111.

When the decanting unit 25 is in its rest position over the trough 26, with the up-flow conduits 111 in the clean water trough 26, air pressure is directed onto the water in that trough for causing the water to flow through the conduits 111, 112 and 113 into the drain trough 27, for cleansing the decanting pipes. When the decanting unit 25 is in its working position, with the conduits 111 in the centrifuge tubes 45 and the decanting conduits 113 extending downwardly into the test tubes 65, air pressure is directed onto the contents of the tubes 45 to cause them to flow into the tubes 65. When the test tubes 65 and rack 66 have been removed and the drain cover 71 has been raised, the contents of the centrifuge tubes 45 can be drained into the drain 72 under the air pressure directed onto the contents of the tubes 45.

MULTI-DECANTING UNIT TRACKS

Figure 2:
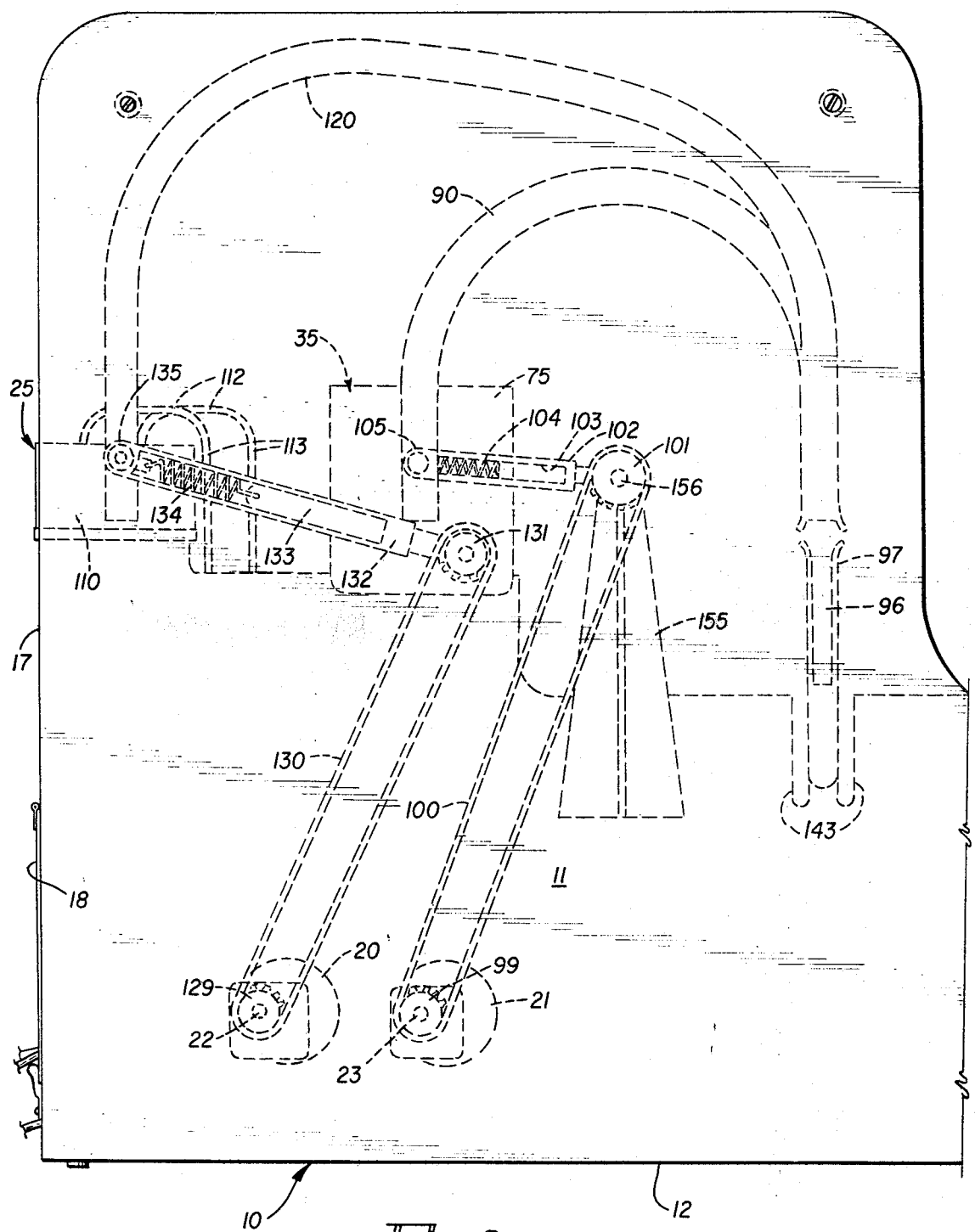
FIG. 2 is an elevational side view of the machine as viewed from the left hand side of FIG. 1, showing particularly the tracks on which the multi-decanter unit and the urinometer dispensing unit travel when moving from their rest positions to the working area. In this view, parts of the machine at the left and front of the left hand tracks have been omitted.

The tracks on which the multi-decanting unit 25 is moved from its rest position to the work area and vice versa are shown in FIGS. 1–3. Left and right hand tracks 120, 121, are connected by brace rod 122. The tracks 120, 121 are curved, and channel form in cross section, to receive rollers 123 loosely mounted on stub shafts 124 projecting from opposite side walls of the casing 110. The shafts 124 are long enough to support the rollers 123 in the tracks 120, 121, which are located in vertical planes located outwardly of the tracks 90, 91, on which the urinometer dispensing unit 35 travels. Guide blocks 125 are fixedly mounted on the side walls of the casing 110 in vertical alignment with the stub shafts 124. The guide blocks 125 are provided with parallel vertical side edges and are adapted to enter the channel 96 in the vertical arm 97 of the bracket 98 connected to each side wall 14 of the housing 13 for the purpose of guiding the multi-decanting unit 25 into proper position for decanting fluid from the centrifuge tubes 45 into the test tubes 65 or into the drain 72.

The mechanism for moving the decanting unit 25 in the tracks 120, 121, is similar to the mechanism for moving the urinometer dispensing unit 35 on its tracks 90, 91. The mechanism is located on the left hand side of the machine, in a vertical plane outwardly of the mechanism heretofore described in connection with the dispensing unit 35. It comprises the motor 20, motor shaft 22, sprocket wheel 129 on end of motor shaft 22, belt 130, upper sprocket wheel 131 which has a hub to which is connected the hollow arm 132. An inner arm 133 bearing on coiled spring 134, is telescopically mounted in the hollow arm 132. The arm is pivotally connected at 135 to the stub shaft 124. When the sprocket wheel 131 is rotated by the motor 20, motor shaft 22, and belt 130, swinging movement is imparted to the arm 132. The inner arm 133 and spring automatically adjust the combined length of the arms 132 and 133 to the radii of the track 120 and move the decanting unit 25 in the tracks 120 and 121.

STRIP-DIPPER

A strip-dipper indicated as a whole at 140 in FIG. 8, comprises a pair of legs 141 having knobs 142 on their outer surfaces for slidably engaging slots 143 (FIG. 3) in the side walls 14 of the housing 13. The legs are connected by a cross bar 144 attached to the upper ends of the legs at 145. A pair of clamps 146 are slidable on the cross bar 144 for attaching a chemically sensitive "dip-stix" member 147 to the strip-dipper. Dip-stix comprise a plurality of paper strips 148 which depend from the upper part of the member 147 in spaced relation to enter the tubes 45 for immersion in the contents. The member 147 is shown in its lower position with the strips 148 in the centrifuge tubes 45, and in broken lines in its raised position where the strips can be read for chemical reactions. The strip-dipper 140 is removed from the machine when not in use.

FIG. 14 shows a tray 150 on which centrifuge racks 46 or other parts may be placed without contamination. The tray comprises two sections each including upturned side flanges 151 and 152, the latter being connected together.

Conventional parts include a brace or support 155 for the shaft 156 on which sprocket 101 is mounted, and a brace or support 157 for the motor shaft 23. Motor shaft 22 is supported by mounting in the wall 11 at 158.

OPERATION

When the multi-decanting unit 25 is not in use, it is in its rest position, supported on the side walls 14 of the housing 13, over the troughs 26, 27, with the fluid intake conduits 111 in trough 26 and the outlet conduits 113 in trough 27. Compressed air is forced into the housing 110 through air line 114, through nozzles 115 to the surface of the clean water in trough 26 and causes water to flow through the decanting pipes into the trough 27 to drain 30 for cleansing the tubes.

The urinometer unit 35 is supported on the upper edges of the side walls 14, in rest position, with the urinometers gripped in gripper bars 80, 81, and 82, 83, depending into the clean water in trough 36. Trough 36 overflows into drain trough 27.

Urine specimens to be analyzed are placed in centrifuge tubes 45 in foldable racks 46. To facilitate the color and appearance examinations, the rearward rack 46 is raised by pushing the handles 59 rearwardly until the shanks of the screws or rivets 60, which connect the handles to tray 57 on which the rearward rack 46 rests, enter the slots 61 in walls 14, whereupon the spring 62 under the tray 57 forces the tray and the rearward rack 46 with centrifuge tubes therein to raised position. The examination of the contents of tubes 45 is aided by the fluorescent lamp 63.

After the color and appearance examination has been completed, specimens remain in the centrifuge tubes 45, and may be subjected to specific gravity tests. The urinometer dispensing unit 35 is moved from its rest position to the working area by the rollers 93 in tracks 90, 91. When the unit reaches the lower forward end of the tracks, the guide blocks 95 on the opposite sides of the casing 75 of unit 35 enter the channels 96 in the brackets 98 and guide the urinometers 85 into the contents of the centrifuge tubes 45. The movement of the unit 35 is achieved by operating the motor 21, motor shaft 23, sprocket wheel 99, belt 100, sprocket wheel 101, and arms 102, 103, for moving the stub shafts 94 which project from opposite sides of the casing 75 of unit 35. After the urinometers 85 have been dispensed into the tubes 45 by releasing the gripping bars, the unit 35 may be returned to rest position. After the urinometers have been read, the unit 35 is again moved into the working area, the gripper bars 80, 81, and 82, 83 again engage the urinometers and carry them back to the rest position where they are immersed in the water in the trough 36.

The specimens in the centrifuge tubes 45 may now be subjected to chemical tests for pH reaction, and sugar, acetone and blood content. For this purpose, the strip-dipper 140 is installed by sliding the legs 141 downwardly in the slots 143 of the walls 14 by knobs 142 (FIG. 3), attaching the paper dip-stix 147 to the cross bar 144, and immersing the strips 148 in the specimens in tubes 45. The strips are read by raising the strip-dipper 140. After reading, the dipper is removed.

In order to place the specimens in a centrifuge (not shown), the racks 46 with tubes 45 therein are removed from the machine, the racks are folded as shown in FIG. 16 and placed in the trunnion cups 48, and the cups are placed in a centrifuge (not shown). When centrifugation has been completed, the racks and specimens are restored to the machine. Microscopic examinations may be made at this time. For further chemical tests, such as the albumin test, made after centrifuging, supernatant fluid from the centrifuged specimens must be conveyed into the test tubes 65. This is done by use of the multi-decanting unit 25 which is moved over the tracks 120 to the work area. When the unit 25 reaches the lower forward ends of the tracks 120, the guide blocks 125 on opposite sides of the casing 110 of the decanting unit 25 enter the channel 96 in the bracket 98 and thus guide the conduits 111 into the centrifuge tubes 45 and guide the conduits 113 into the test tubes 65. The movement of the unit 25 is achieved by operating the motor 20, motor shaft 22, sprocket wheel 129, belt 130, upper sprocket wheel 131, and arm 132, 133, which move the stub shafts 124 which project from opposite sides of the casing 110 of the unit 25. After the decanting pipes are in place in the tubes 45 and 65, air under pressure conveyed through the air line 114 into the casing 110 is passed through nozzles 115 to the specimens in tubes 45 as shown in FIGS. 10–12, forcing the supernatant fluid from tubes 45 to test tubes 65 for observing the reaction with an albumin reagent.

The decanting unit 25 also is employed for conducting microscopic examinations subsequent to centrifuging, where it is desirable to have a small amount of the supernatant fluid in the centrifuge tubes in which to re-suspend sediment for examination. Decanting the excess supernatant fluid from the centrifuge tubes is performed by removing the rack 66 and test tubes 65, raising the drain cover 71, and forcing the excess fluid by air pressure passing from casing 110 and nozzles 115 onto the supernatant fluid in tubes 45, through conduits 113 into the drain 72. After use, the multi-decanter unit 25 is returned to the cleansing trough 26 where air pressure is applied to the surface of the clean water to force it through the pipes 111–113 of the unit into the drain trough 27 to drain 30, 31.

In describing the invention, reference has been made to a particular example embodying the same, but I wish it to be understood that the invention is not limited to the construction shown in the drawing and that various changes may be made in the construction and general arrangement of parts without departing from the invention. For example, any desired number of centrifuge tubes may be arranged in a single row and of test tubes in another single row, and in such construction the decanting pipes and the urinometer dispensing means also would be altered to cooperate with the tubes as arranged. Obviously the number of centrifuge and test tubes may be increased without departing from the scope of the invention. Likewise the mechanisms for actuating the urinometer gripping bars, and for moving the decanting and urinometer dispensing units from rest positions to the work area may be varied by means within the skill of a mechanic.

It will also be understood that parts of the machine may be used for conducting blood and other laboratory tests, and that the centrifuge tubes and the foldable racks as well as the decanting unit and parts shown herein are useful in machines other than the urinalysis machine particularly described and shown.

I claim:

1. A urinalysis machine for simultaneously handling a plurality of urine specimens for physical and chemical examinations, comprising
  (a) a housing,
  (b) open top cleansing fluid troughs and drain means in the housing,
  (c) a plurality of centrifuge tubes arranged in a row in the housing,
  (d) a plurality of test tubes arranged in a row adjacent the centrifuge tubes,
  (e) a urinometer dispensing unit holding a plurality of urinometers in rest positions in a trough and movable from said rest position to a working position above the centrifuge tubes for dispensing urinometers simultaneously in said tubes, and
  (f) a multi-decanting unit provided with a plurality of decanting pipes which depend into a trough in said rest position and movable from said rest position to the centrifuge and test tubes for selectively decanting centrifuge tube contents into said test tubes or to drain means.

2. The urinalysis machine defined by claim 1, which inclues a strip-dipper removably mounted on the housing simultaneously holding a plurality of strips for immersion in said centrifuge tubes for chemical test examinations.

3. The urinalysis machine defined by claim 1, which includes tracks at opposite sides of the housing, and means on each of said multi-decanting and urinometer dispensing units movable in said tracks for moving each of said units from said rest position to the work area of the machine and vice versa.

4. The urinalysis machine defined by claim 1, which includes foldable racks for holding the centrifuge tubes adapted for placement when folded in trunnion cups of a centrifuge.

5. The urinalysis machine defined by claim 1, which includes tracks at opposite sides of the housing, roller means on each of said multi-decanting and urinometer dispensing units movable in said tracks, and motor driven mechanism operatively connected with each of said units for moving each unit from said rest position to the work area of the machine and vice versa.

6. The urinalysis machine defined by claim 1, which includes a rack for holding the centrifuge tubes and means for raising and lowering the rack and centrifuge tubes centrifuge tubes relatively to the housing.

7. The urinalysis machine defined by claim 1, which includes motor actuated gripper bars for yieldably holding the urinometers in the urinometer dispensing unit.

8. The urinalysis machine defined by claim 1, which includes means for conducting pressurized air to the multi-decanting unit for passage to the cleansing trough when the unit is in said rest position and for passage to the centrifuge tubes when the unit is in position to decant centrifuge tube contents.

9. The urinalysis machine defined by claim 1, which includes a water intake trough and a water drain trough, and in which the multi-decanting unit is provided with a plurality of decanting pipes which have intake conduits deepnding into the water intake trough and outlet conduits depending into the water drain trough for circulation of water through the decanting pipes when the unit is in said rest position.

10. A urinalysis machine for simultaneously handling a plurality of urine specimens for physical and chemical examinations, comprising
  (a) a housing,
  (b) open top cleansing fluid troughs and drain means in the housing,
  (c) a plurality of centrifuge tubes arranged in staggered relation in two rows transversely of the housing,
  (d) a plurality of test tubes arranged in staggered relation in two rows adjacent the centrifuge tubes,
  (e) a urinometer dispensing unit holding a plurality of urinometers in staggered relation in one of said troughs and movable from a rest position in one of said troughs to a working position above the centrifuge tubes for dispensing urinometers simultaneously in said tubes, and
  (f) a multi-decanting unit provided with a plurality of decanting pipes in staggered relation which depend into a cleansing fluid trough and into drain means when in said rest position, said multi-decanting unit being movable for selectively decanting centrifuge tube contents into said test tubes or to drain means.

11. The urinalysis machine defined by claim 10, which includes a water intake trough and a water drain trough, and in which the multi-decanting unit pipes have intake conduits depending into the water intake trough and outlet conduits depending into the water drain trough for circulation of water through the decanting pipes when the unit is in said rest position.

12. The urinalysis machine defined by claim 11, in which the multi-decanting unit includes a pressurized air line leading into the unit and a plurality of nozzles on the lower surface of the unit, the intake conduits extending through the nozzles while permitting air to flow downwardly around the conduits.

13. The urinalysis machine defined by claim 10, which includes a strip-dipper removably mounted in the housing simultaneously holding a plurality of strips for immersion in a row of centrifuge tubes for chemical test examinations.

14. The urinalysis machine defined by claim 10, which includes foldable racks for holding the centrifuge tubes of each row, said foldable racks being adapted while folded and holding said tubes to be placed in trunnion cups of a centrifuge.

15. The urinalysis machine defined by claim 10, which includes tracks at opposite sides of the housing, roller means on each of said multi-decanting and urinometer dispensing units movable in said tracks, motor driven mechanism operatively connected with each of said units for moving each unit from said rest position to the work area of the machine, and cooperating means on the sides of each of said units and on the housing for guiding said units into position for dispensing urinometers into centrifuge tubes or for decanting centrifuge tube contents.

16. The urinalysis machine defined by claim 10, which includes a tray movably mounted in the housing for supporting a row of centrifuge tubes, and means for raising and lowering said tray relatively to the housing.

17. The urinalysis machine defined by claim 10, which includes two sets of gripper bars for yieldably holding the urinometers in two rows in the urinometer dispensing unit.

18. The urinalysis machine defined by claim 10, which includes a pressurized air line leading into the multi-decanting unit and a plurality of nozzles on the lower surface of the unit arranged in two rows corresponding to the staggered positions of the centrifuge tubes in a pair of rows.

19. The urinalysis machine defined by claim 10 which includes a strip-dipper mounted on the housing, comprising a pair of legs connected in spaced relation by a cross bar, clamps slidable on the cross bar, and a plurality of strips depending from a cross piece removably attached to the strip-dipper by said clamps.

20. A urinalysis machine for simultaneously handling a plurality of urine specimens for physical and chemical examinations, comprising
(a) a housing,
(b) a plurality of centrifuge tubes removably supported in the housing,
(c) a plurality of test tubes removably supported in the housing,
(d) a urinometer dispensing unit holding a plurality of urinometers while supported in a rest position on the housing and movable to a urinometer dispensing position above the centrifuge tubes, and
(e) a multi-decanting unit including intake conduits and outlet conduits supported in said rest position on the housing and movable to a decanting position above the centrifuge and test tubes for entry of the conduits in said tubes.

21. The urinalysis machine defined by claim 20 which includes tracks at opposite sides of the housing, and means on the urinometer dispensing unit and on the multi-decanting unit movable in said tracks.

22. The urinalysis machine defined by claim 21 which includes pivotally mounted arms operatively connected to the urinometer dispensing unit and to the multi-decanting unit having means for altering the length of the arms, and means for imparting swinging movement to said arms for moving each of said units from said rest position to an operative position.

23. The urinalysis machine defined by claim 20 which includes pressurized air conducting means passing pressurized air through the decanting unit to the centrifuge tubes when said conduits are in the tubes.

24. The urinalysis machine defined by claim 20, which includes a foldable rack in which the centrifuge tubes are mounted, and a trunnion cup adapted to receive the rack when folded and the centrifuge tubes therein mounted, for placement in a centrifuge.

References Cited

UNITED STATES PATENTS

| | | | |
|---|---|---|---|
| 685,538 | 10/1901 | Starz | 23—253 |
| 2,077,211 | 4/1937 | Buckley | 23—253 |
| 3,038,340 | 6/1962 | Psreeli. | |
| 3,168,124 | 2/1965 | Lenkey | 23—253 X |
| 3,186,235 | 6/1965 | Ferrari | 23—253 X |
| 3,193,359 | 7/1965 | Baruch et al. | 23—259 |
| 3,252,330 | 5/1966 | Kling | 23—253 X |
| 3,266,322 | 8/1966 | Neegersmith et al. | 23—253 X |
| 3,282,651 | 11/1966 | Ferrari et al. | 23—253 |

MORRIS O. WOLK, Primary Examiner

B. S. RICHMAN, Assistant Examiner

U.S. Cl. X.R.

23—230, 253; 73—444; 141—130